(12) United States Patent
Christianson et al.

(10) Patent No.: US 8,011,109 B2
(45) Date of Patent: Sep. 6, 2011

(54) CASING MOUNT FOR A CYLINDRICAL VIAL

(75) Inventors: John Christianson, Waukesha, WI (US); Roger D. Stanford, Waterford, WI (US)

(73) Assignee: Empire Level Mfg. Corp., Mukwonago, WI (US)

( * ) Notice: Subject to any disclaimer, the term of this patent is extended or adjusted under 35 U.S.C. 154(b) by 243 days.

(21) Appl. No.: 12/394,369

(22) Filed: Feb. 27, 2009

(65) Prior Publication Data

US 2010/0218391 A1    Sep. 2, 2010

(51) Int. Cl.
*G01C 9/00* (2006.01)

(52) U.S. Cl. ............................................. 33/451; 33/379

(58) Field of Classification Search .................... 33/365, 33/369, 377, 379, 1 LE, 451
See application file for complete search history.

(56) References Cited

U.S. PATENT DOCUMENTS

| | | | |
|---|---|---|---|
| 356,645 A * | 1/1887 | Jasper | 33/349 |
| 786,269 A | 4/1905 | Curry | |
| 2,502,905 A | 4/1950 | Vaida et al. | |
| 2,639,514 A | 5/1953 | Garrison | |
| 2,679,698 A * | 6/1954 | Roberts | 33/381 |
| 2,993,281 A | 7/1961 | Dock | |
| 3,593,428 A | 7/1971 | Jacoff | |
| 3,738,015 A | 6/1973 | De Jong | |
| 4,011,660 A | 3/1977 | Johnson | |
| 4,124,940 A | 11/1978 | Vaida | |
| 4,407,075 A * | 10/1983 | MacDermott et al. | 33/348.2 |
| 4,534,117 A | 8/1985 | Haefner et al. | |
| 4,581,828 A | 4/1986 | Handler et al. | |
| 4,685,219 A | 8/1987 | Haefner et al. | |
| 4,860,459 A | 8/1989 | Dengler | |
| 4,991,303 A | 2/1991 | Marth et al. | |
| 4,996,777 A | 3/1991 | Grosz | |
| 5,033,199 A | 7/1991 | Wilcox et al. | |
| 5,105,549 A | 4/1992 | Johnson | |
| 5,406,714 A | 4/1995 | Baker et al. | |
| 6,148,530 A | 11/2000 | Jacoff et al. | |
| 6,675,490 B1 | 1/2004 | Krehel et al. | |
| 6,760,975 B1 | 7/2004 | Schmidt | |
| 6,792,686 B2 | 9/2004 | Krehel et al. | |

(Continued)

OTHER PUBLICATIONS

Excerpts of International Search Report and Written Opinion for PCT/US10/00586. Date: May 21, 2010. 3 pages.

(Continued)

*Primary Examiner* — G Bradley Bennett
*Assistant Examiner* — Tania C Courson
(74) *Attorney, Agent, or Firm* — Jansson Shupe & Munger Ltd.

(57) ABSTRACT

A level of the type having an elongate hollow frame including two sidewalls each defining axially aligned vial openings into the frame. A vial casing is secured with respect to the frame and defines a hermetically sealed single-cavity casing interior entirely enclosing a liquid-and-bubble vial with a substantially cylindrical outer surface extending between two vial ends. The casing is formed of two opposite round face-walls and a surrounding cylindrical wall therebetween. The cylindrical wall has a pair of opposed major wall-portions of first thickness and a pair of opposed intervening wall-portions of second thickness greater than the first thickness. Each intervening wall-portion defines a recess which snugly receives a corresponding one of the vial ends. The inner surface of the surrounding wall is smooth and substantially free of light-ray-interfering structures, whereby the vial appears embedded in the surrounding wall and the face-walls provide uninterrupted full views of and about the cylindrical vial.

16 Claims, 8 Drawing Sheets

U.S. PATENT DOCUMENTS

| | | |
|---|---|---|
| 7,472,486 B2 * | 1/2009 | Tran et al. ................... 33/379 |
| 7,472,487 B2 | 1/2009 | Tran et al. |
| 2004/0143981 A1 | 7/2004 | Krehel et al. |
| 2005/0229416 A1 | 10/2005 | Kim |
| 2006/0248737 A1 | 11/2006 | Morrissey et al. |
| 2007/0266578 A1 | 11/2007 | Tran et al. |

OTHER PUBLICATIONS

Domenico Tavecchio brochure. Milano, Italy. Undated.

* cited by examiner

CASING MOUNT FOR A CYLINDRICAL VIAL

FIELD OF THE INVENTION

This invention relates to levels and, more particularly, to a vial assemblies for inclusion in levels.

BACKGROUND OF THE INVENTION

In the construction industry, levels are used to ensure that structural members are installed in their exact intended orientations. Common construction levels include plural vials to indicate at least horizontal and plumb (vertical) orientations. In addition to a centrally-positioned vial, most levels include at least one other vial positioned within the frame of the level away from the center. Because such other vial(s) can be viewed only from either side of the frame, it is desirable to provide a clear and open view of the vial which provides easy reading thereof.

A number of prior levels have so-called block vials installed at within-the-frame positions such that they are viewable from the side of the frame. While such block vials provide good protection for the vial, manufacturing of such block vials involves complicated techniques, including complicated machining of the interiors of block-vial interiors which increases the cost of level manufacturing. Since block vials typically have a substantially rectangular outer shape and are installed in a round opening within the frame of the level, the sides of such rectangular block interfere with light rays and reduce clarity in vial reading. Further, the space between the rectangular vial sides and the edges of the level-frame openings tends to become foggy or collect dust which further decreases the vial clarity and detracts from the overall quality of the level.

Some prior levels, such as those disclosed in U.S. Pat. No. 786,269 (Curry), U.S. Pat. No. 4,124,940 (Vaida) and U.S. Pat. No. 4,991,303 (Marth et al.), have attempted to secure substantially cylindrical vials to the level frame. However, such prior installations have multiple shortcomings which negatively effect the quality of the levels and visual characteristics of the vial.

For example, in the Curry patent the vials are secured within a vial holder by filling gaps around the ends of the vial with plaster-of-paris or other suitable material which remains visible when the vial holder is installed within the frame of the level. Such materials for securing the vial to the holder require special handling for accurate and clean application to produce good appearance. This results in higher cost and problems with respect to vial appearance and overall level quality.

In the Vaida level, half of the vial holder is first secured to the level frame and then the other vial-holder half, with a cylindrical vial mounted therein, is rotationally secured to the first half. This assembly requires secure engagement between the vial and the second half of the vial holder, and secure engagement typically involves certain configurational features for the vial and the second vial-holder half. Such features create multiple light-interfering structures about the vial, and this degrades overall visibility of the vial itself. Furthermore, the rotational relationship between the halves dictates positioning of the vial substantially fully within the second half of the vial holder and off the center of the frame of the level. This compromises visibility of the vial from one side. In addition, installation of the open vial casing to the level frame allows a probability of contamination of the interior of the holder, which results in degrading the space around the vial and, over time, reducing reading clarity of the vial itself.

Similarly, in the Marth et al. patent, a open two-half vial case is secured to the frame by sandwiching the vial and the frame between the case halves. Thus, the case interior is prone to contamination during handling and installation. Furthermore, the accuracy of the vial orientation in the Marth et al. patent is dependent on precision of an octagonal vial opening and precision in forming the octagonal vial case. Finally, such octagonal shape, which is critical for the vial casing of the Marth et al. patent, by its nature has multiple differently-angled surfaces which reflect and bend light rays, thus decreasing clarity of observation of the vial.

In the field of high-precision measuring and sensing instruments such as construction levels, quality and visual clarity are matters of great importance. There is a need for an improved level which overcomes the aforementioned problems; more specifically, there is a need for an improved cylindrical-vial mounting structure that provides improved and lasting clarity of the vial and the visibility through the vial opening about the vial for easy and clear reading of the vial.

OBJECTS OF THE INVENTION

It is an object of the invention to provide an improved level which overcomes some of the problems and shortcomings of the prior art, including those referred to above.

Another object of this invention is to provide an improved casing mount for a cylindrical vial to provide a clear open view for easy reading of the vial.

Another object of the invention is to provide an improved casing mount for a cylindrical vial to provide lasting protection of the vial.

Still another object of the invention is to provide an improved casing mount for a cylindrical vial of a simple and clean construction.

Another object of the invention is to provide an improved casing mount for a cylindrical vial which facilitates easy and inexpensive assembly of a level.

Yet another object of the invention is to provide a method for manufacturing a level utilizing such an improved casing mount for a cylindrical vial.

How these and other objects are accomplished will become apparent from the following descriptions and the drawings.

SUMMARY OF THE INVENTION

This invention, which will be described in detail below, is an improvement in levels of the type including an elongate hollow frame formed by two sidewalls each defining axially aligned vial openings into the frame.

The inventive level has a vial casing secured with respect to the frame. The vial casing defines a hermetically sealed single-cavity casing interior entirely enclosing a liquid-and-bubble vial. The vial has a substantially cylindrical outer surface extending between two vial ends. The casing is formed of two opposite round face-walls and a surrounding cylindrical wall therebetween. The surrounding cylindrical wall has a pair of opposed major wall-portions of first thickness and a pair of opposed intervening wall-portions of second thickness which is greater than the first thickness. Each intervening wall-portion defines a recess which snugly receives a corresponding one of the vial ends. The inner surface of the surrounding wall is smooth and substantially free of light-ray-interfering structures. The vial appears embedded in the surrounding wall. The face-walls provide uninterrupted full views of and about the cylindrical vial.

In highly preferred embodiments of this invention, the vial casing is formed of first and second parts. The first and second parts include respective first and second part-walls which together form the surrounding cylindrical wall. Each part-wall borders one of the round face-walls and extends therefrom to terminate at an outer edge.

In some preferred embodiments, the first and second part-walls are in mating engagement at their outer edges. The first part-wall preferably includes a partial wall-thickness extension beyond the outer edge. The second part-wall preferably defines an indentation at the outer edge for receiving the extension therein.

It is highly preferred that the outer edges are sealed together forming hermetically-sealed vial casing interior.

The first and second part-walls preferably have substantially equal exterior axial dimensions. Each such dimension is defined by a distance between an exterior surface of the corresponding round face-wall and the outer edge.

In some preferred embodiments, the first part-wall extension defines a notch therein. The second part-wall has a tooth extending from the indentation and dimensioned for positioning within the notch. The notch is aligned with the tooth to facilitate alignment of the first and second parts enclosing the vial within the casing interior.

Another aspect of the present invention is a method of manufacturing a level of the type having an elongate hollow frame formed by two sidewalls each defining axially aligned vial openings into the frame.

In this inventive method, a liquid-and-bubble vial is provided. The vial has a substantially cylindrical outer vial surface extending between two vial ends.

Also provided is a vial casing which has first and second parts. Each part is formed of a round face-wall bordered by a surrounding cylindrical wall terminating at an outer edge. Each surrounding cylindrical wall has a pair of opposed major wall-portions of first thickness and a pair of opposed intervening wall-portions of second thickness which is greater than the first thickness. Each intervening wall-portion defines a recess conforming to dimensions of the vial ends.

The inventive method further includes the steps of placing the vial into the first casing part with the vial ends snugly in the first-part recesses, connecting outer edges of both casing parts with the vial ends snugly within the recesses, hermetically sealing the outer edges of the casing parts to form an air/water-tight casing interior enclosing the vial, positioning the hermetically-sealed casing within the level frame axially aligning the round face-walls with the vial openings, and securing the casing within the frame.

Prior to securing the casing, the method preferably includes the step of calibrating the vial orientation by rotating the surrounding cylindrical wall about the axis.

It is preferred that, in the vial casing, the first part-wall includes a partial wall-thickness extension beyond the outer edge and the second part-wall defines an indentation at the outer edge. The connecting step of the method preferably includes the step of positioning the extension within the indentation.

In some preferred embodiments of the method, the first part-wall extension of the vial casing defines a notch therein and the second part-wall has a tooth extending from the indentation and dimensioned for positioning within the notch. The notch is aligned with the tooth. In such preferred embodiments of the inventive method, the connecting step further includes the step of positioning the tooth within the notch thereby aligning the first and second parts for proper hermetic sealing thereof.

DETAILED DESCRIPTION OF PREFERRED EMBODIMENTS

Figure 1:
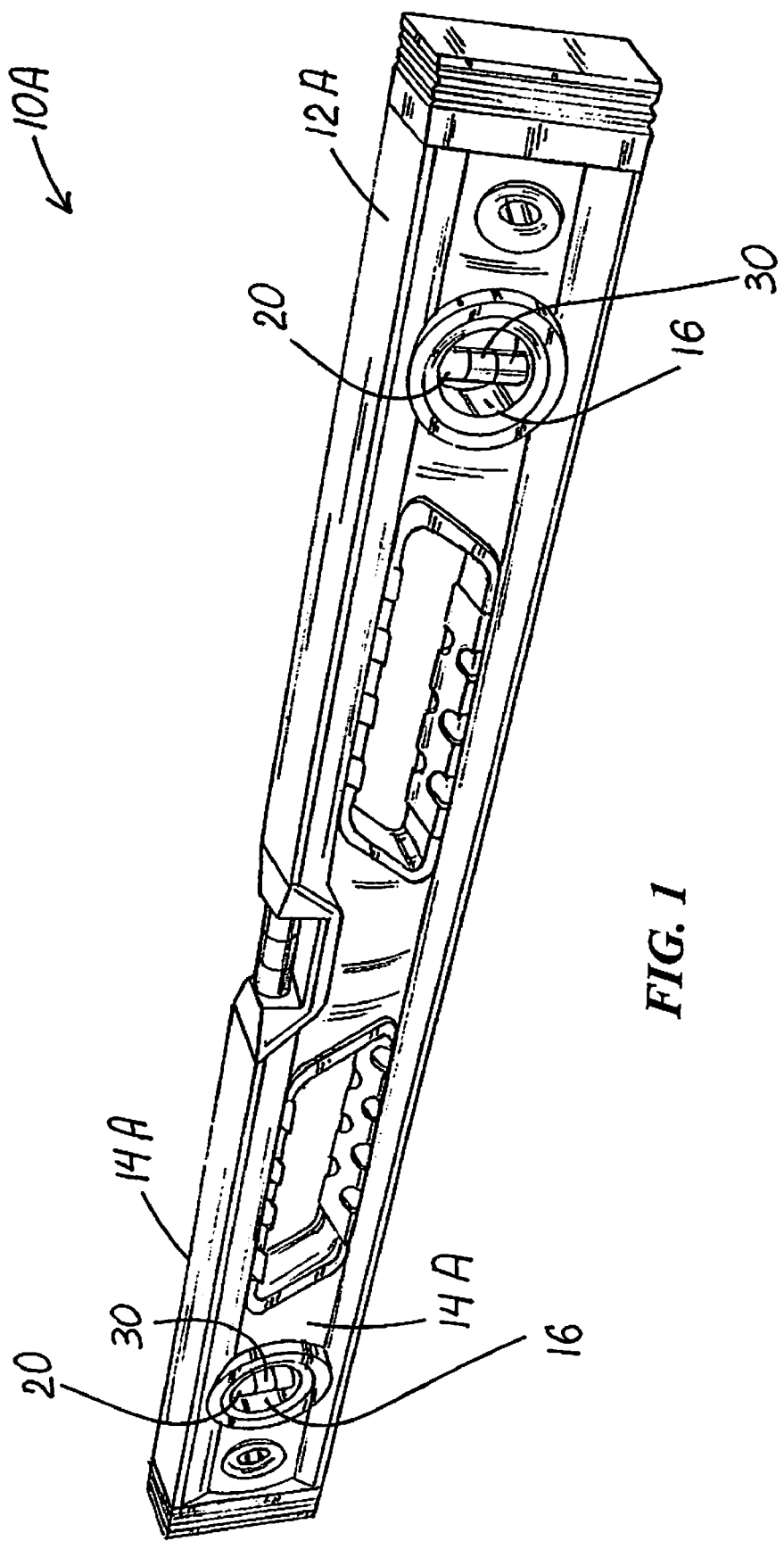
FIG. 1 is a perspective view of one version of a level with the inventive vial casing.
Figure 2:
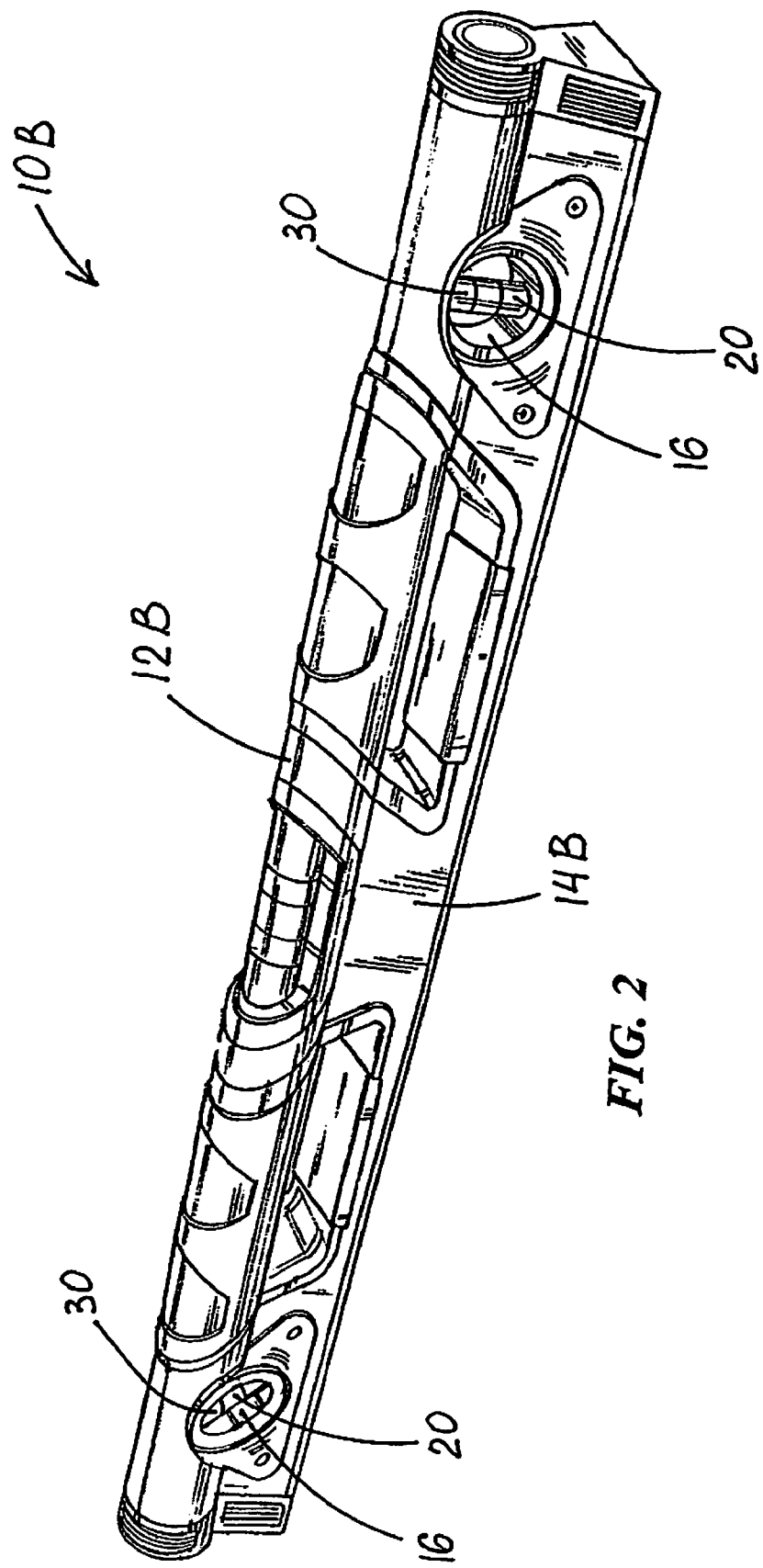
FIG. 2 is a perspective view of another version of a level with the inventive vial casing.

FIGS. 1 and 2 show levels 10A and 10B each including an elongate hollow frame 12 (A and B, respectively) formed by two sidewalls 14 (A and B, respectively) each defining axially aligned vial openings 16 into frame 12. Each of levels 10A and 10B has a liquid-and-bubble vial 20.

FIGS. 3-8 best illustrate a vial casing 30, which is secured with respect to frame 12. Casing 30 defines a hermetically sealed single-cavity casing interior 33 entirely enclosing vial 20. Vial 20 has a substantially cylindrical outer surface 22 extending between two vial ends 24. Casing 30 is formed of two opposite round face-walls 34 and a surrounding cylindrical wall 36 therebetween. It is best seen in FIGS. 3 and 6-8 that surrounding cylindrical wall 36 has a pair of opposed major wall-portions 37 of first thickness 37A and a pair of opposed intervening wall-portions 38 of second thickness 38A. Second thickness 38A is greater than first thickness 37A. Each intervening wall-portion 38 defines a recess 39 which snugly receives a corresponding one of vial ends 24. As seen in FIGS. 3 and 6-8, inner surface 36A of surrounding wall 36 is smooth and substantially free of light-ray-interfering structures. Vial 20 appears embedded in surrounding wall 36. Face-walls 34 provide uninterrupted full views of and about cylindrical vial 20.

FIGS. 4-8 best illustrated the preferred embodiment in which vial casing 30 is formed of a first part 31 and second part 32. First and second parts 31 and 32 include respective first and second part-walls 361 and 362 which together form surrounding cylindrical wall 36. Each part-wall 361 and 362 borders one of round face-walls 34 and extends therefrom to terminate at an outer edge 311 and 321, respectively.

Figure 4:
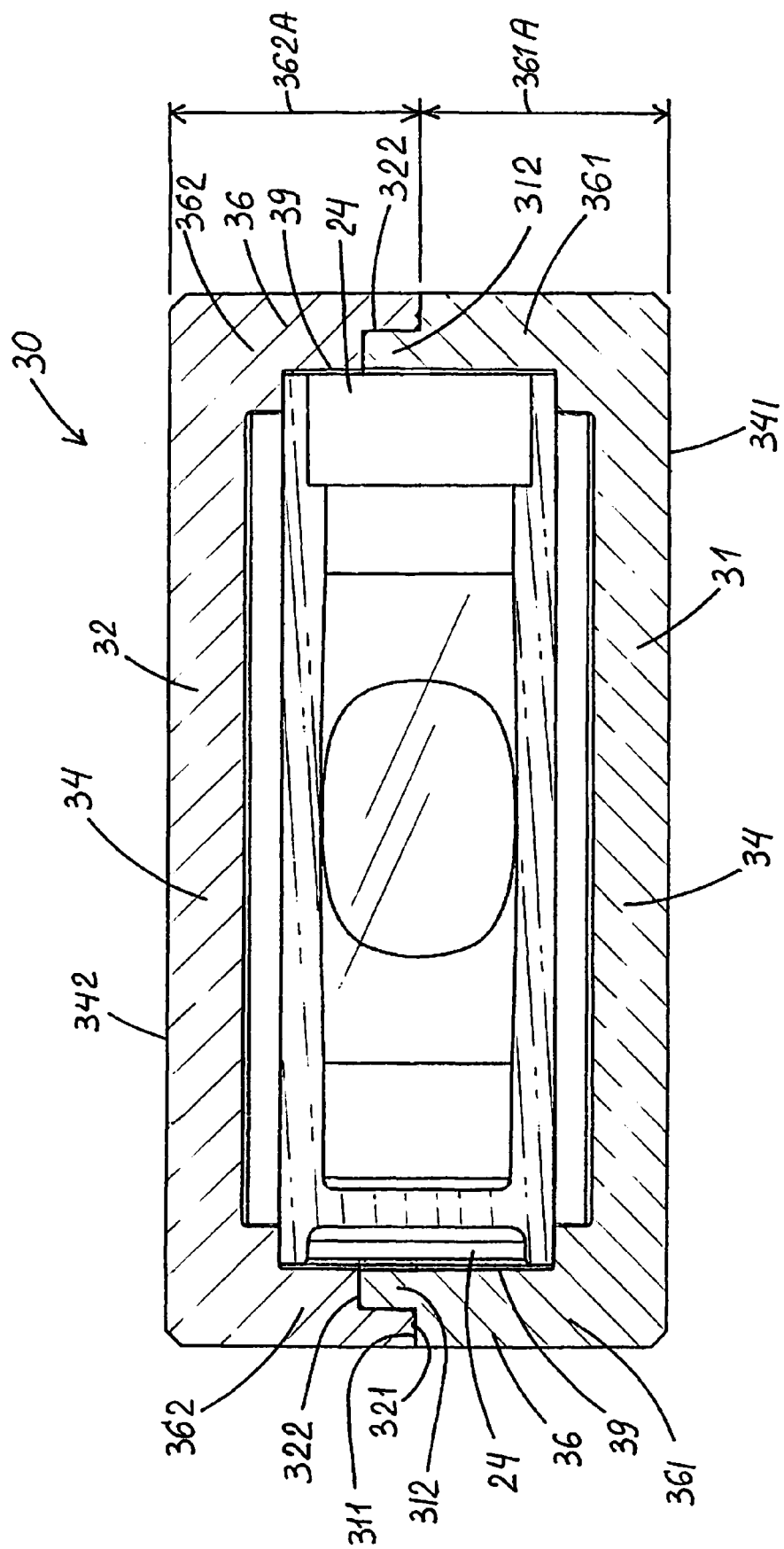
FIG. 4 is a cross-section view of the vial casing of FIG. 3 along lines 4-4.
Figure 6:
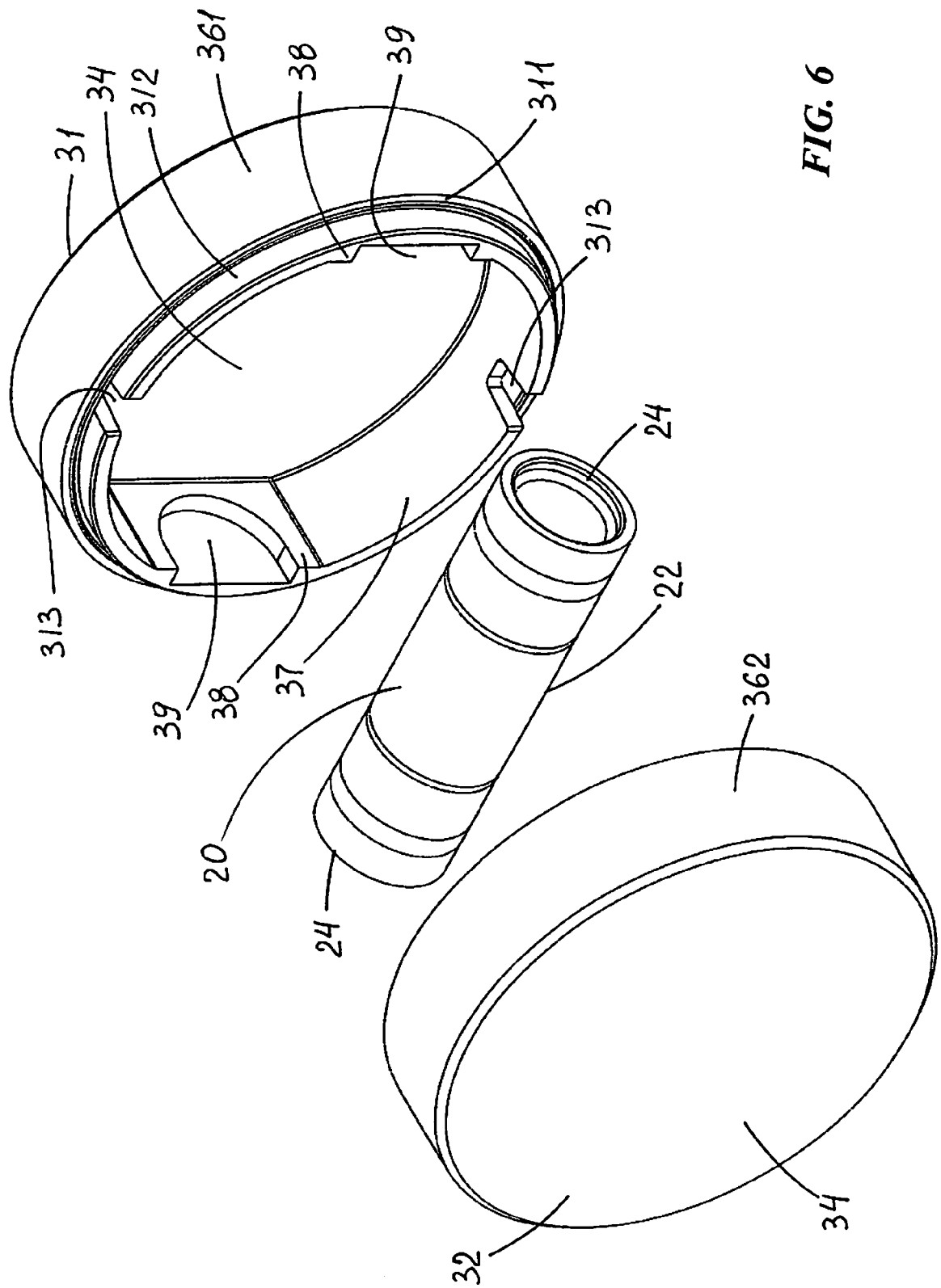
FIG. 6 is an exploded perspective view of the vial casing of FIG. 3 showing the configuration of one vial-casing part.
Figure 7:
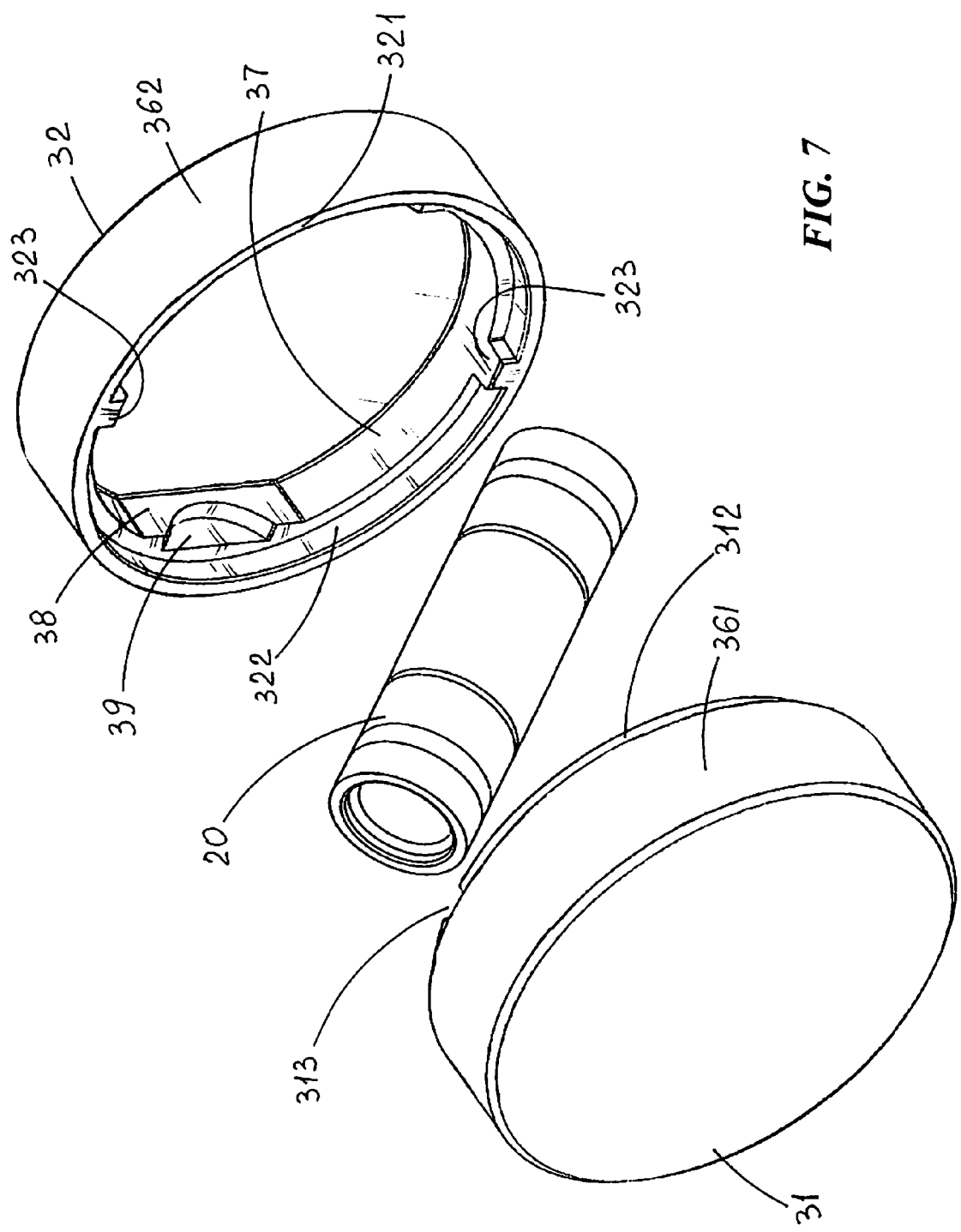
FIG. 7 is another exploded perspective view of the vial casing of FIG. 3 showing the configuration of the other vial-casing part.

As best seen in FIGS. 4, 6 and 7, first and second part-walls 361 and 362 are in mating engagement at their outer edges 311 and 321. First part-wall 361 includes a partial wall-thickness extension 312 beyond outer edge 311. Second part-wall 362 defines an indentation 322 at outer edge 321 for receiving extension 321 therein.

Outer edges 311 and 321 are sealed together forming hermetically-sealed vial casing interior 33. In some embodiments, outer edges 311 and 321 are ultrasonically welded together such that casing interior 33 is hermetically sealed. However, other means for connecting edges 311 and 321 to achieve water/air-tight seal of casing interior 33 may be used.

FIG. 4 further shows that first and second part-walls 361 and 362 have substantially equal exterior axial dimensions 361A and 362A.

Figure 5:
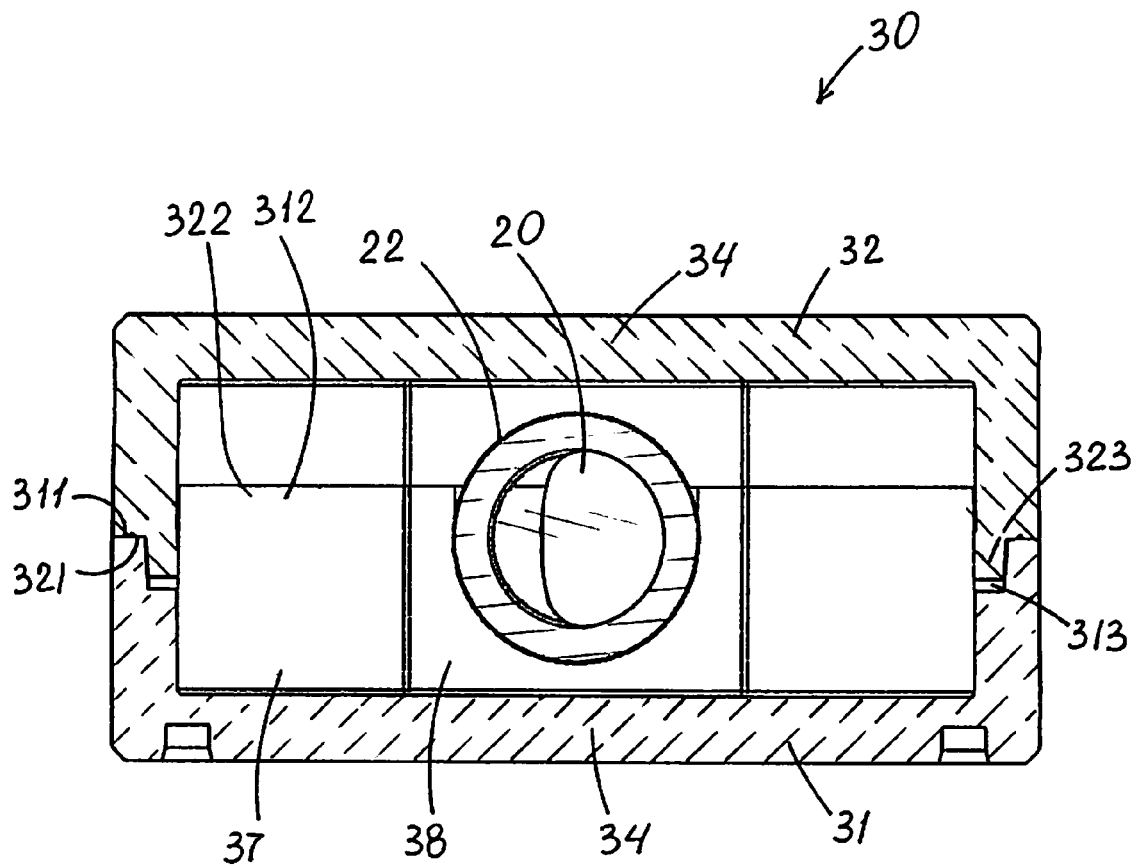
FIG. 5 is another cross-section view of the vial casing of FIG. 3 along lines 5-5.

It is seen in FIGS. 5-7 that first part-wall extension 312 defines a notch 313 therein. Second part-wall 362 has a tooth 323 extending from indentation 322 and dimensioned for positioning within notch 313. As best shown in FIG. 5, notch 313 is aligned with tooth 323 to facilitate alignment of first and second parts 31 and 32 when enclosing vial 20 within casing interior 33.

In another aspect of the present invention, a method of manufacturing level 10, liquid-and-bubble vial 16 is provided. As shown in FIGS. 6 and 7, also provided is vial casing 30 which has first and second parts 31 and 32.

Figure 3:
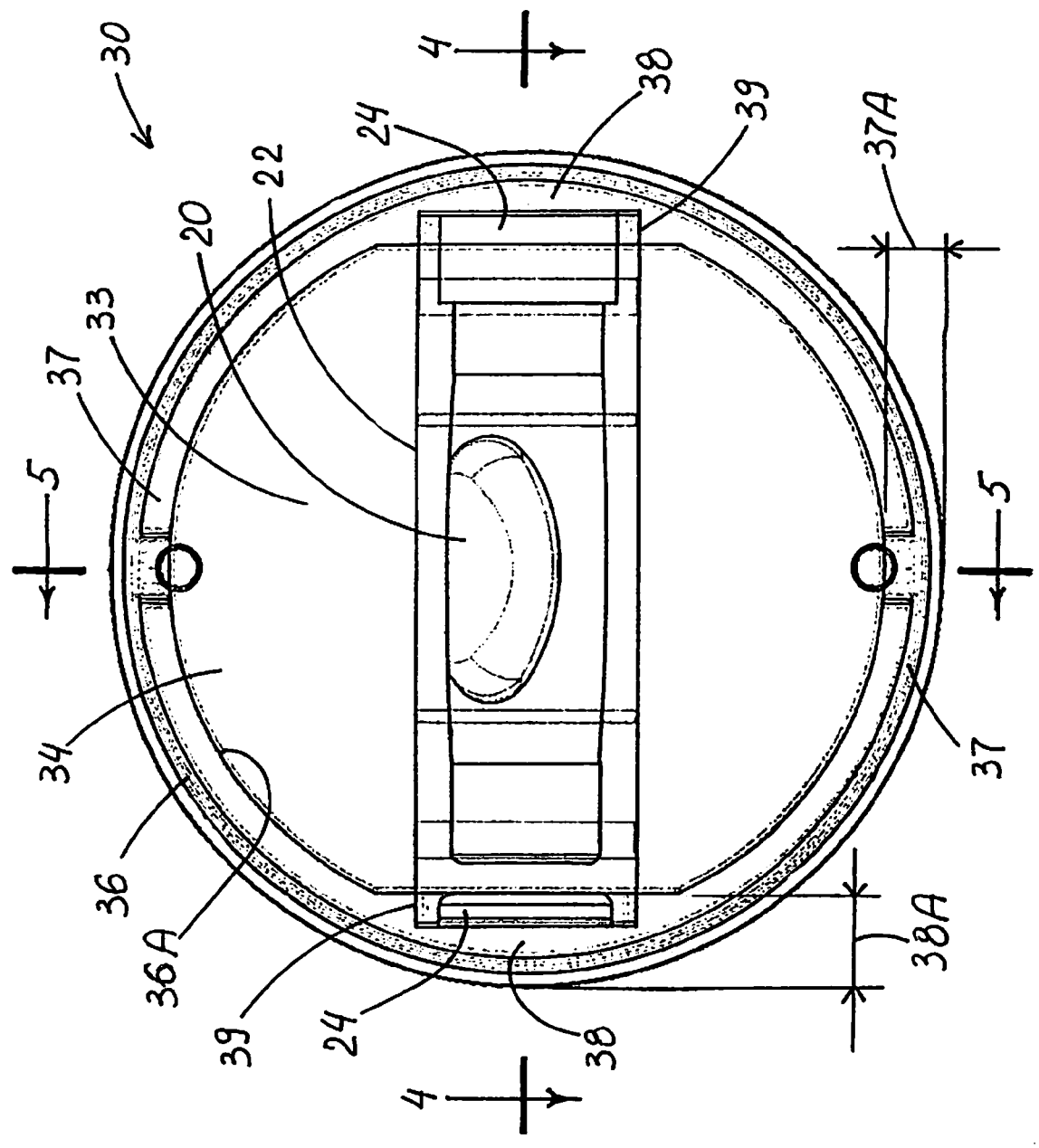
FIG. 3 is a front view of the inventive vial casing enclosing the vial which is seen through a face-wall.
Figure 8:
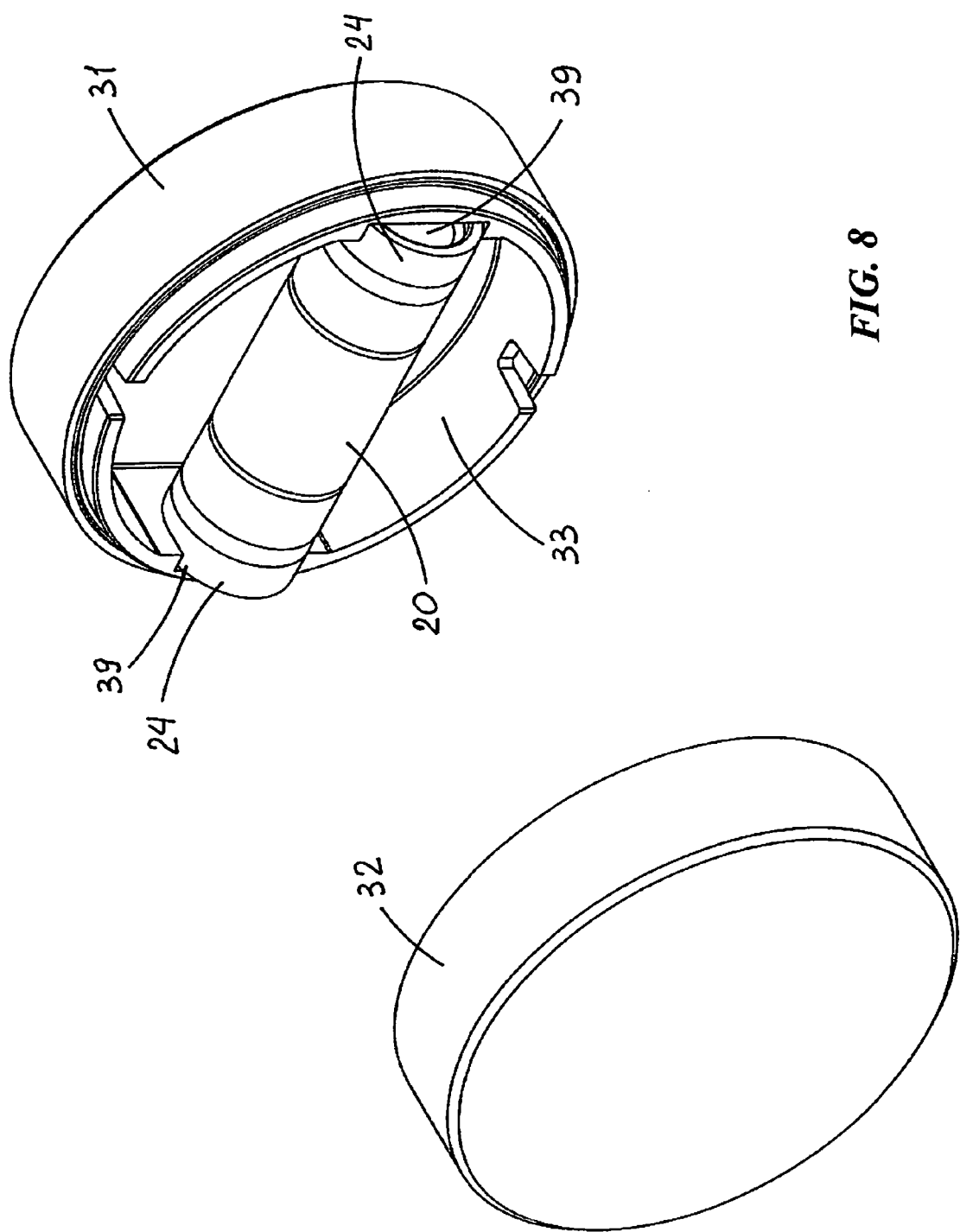
FIG. 8 is an exploded perspective view of the vial casing and the vial as in FIG. 6 but showing the vial within one casing part.

FIG. 8 illustrates the step of placing vial 20 into first casing part 31 with vial ends 24 snugly in first-part recesses 39. The method further includes a step connecting outer edges 311 and 321 of both casing parts 31 and 32 with vial ends 24 snugly within recesses 39. Outer edges 311 and 321 of casing parts 31 and 32 are then hermetically sealed to form an air/water-tight casing interior 33 enclosing vial 20, as shown in FIGS. 3-4. Such hermetically-sealed casing 30 is positioned within level frame 12 axially aligning the round face-walls with the vial openings as illustrated in FIGS. 1 and 2. Finally casing 30 is secured within frame 12.

Prior to securing casing 30 to frame 12, the vial orientation can be calibrated by rotating surrounding cylindrical wall 36 about the axis. This step further allows installation of two vial-casings 30 in different vial orientation, i.e., one with plumb orientation and another at 45°.

During the connection of outer edges 311 and 321, extension 312 is positioned within indentation 322. The aligning of first and second parts 31 and 32 for proper hermetic sealing thereof is facilitated by positioning of tooth 323 within notch 313.

While the principles of the invention have been shown and described in connection with specific embodiments, it is to be understood that such embodiments are by way of example and are not limiting.

The invention claimed is:

1. In a level of the type having an elongate hollow frame including two sidewalls each defining axially aligned vial openings into the frame, the improvement comprising a vial casing secured with respect to the frame and defining a hermetically sealed single-cavity casing interior entirely enclosing a liquid-and-bubble vial with a substantially cylindrical outer surface extending between two vial ends, the casing being formed of two opposite round face-walls and a surrounding cylindrical wall therebetween which has (a) a pair of opposed major wall-portions of first thickness and (b) a pair of opposed intervening wall-portions of second thickness greater than the first thickness, each intervening wall-portion defining a recess which snugly receives a corresponding one of the vial ends, the inner surface of the surrounding wall being smooth and substantially free of light-ray-interfering structures, whereby the vial appears embedded in the surrounding wall and the face-walls provide uninterrupted full views of and about the cylindrical vial.

2. The level of claim 1 wherein the vial casing is formed of first and second parts.

3. The level of claim 2 wherein the first and second parts include respective first and second part-walls which together form the surrounding cylindrical wall, each part-wall bordering one of the round face-walls and extending therefrom to terminate at an outer edge.

4. The level of claim 3 wherein the first and second part-walls are in mating engagement at their outer edges.

5. The level of claim 4 wherein the outer edges are sealed together forming hermetically-sealed vial casing interior.

6. The level of claim 4 wherein the first and second part-walls have substantially equal exterior axial dimensions.

7. The level of claim 4 wherein:
the first part-wall includes a partial wall-thickness extension beyond the outer edge; and
the second part-wall defines an indentation at the outer edge for receiving the extension therein.

8. The level of claim 7 wherein:
the first part-wall extension defines a notch therein; and
the second part-wall has a tooth extending from the indentation and dimensioned for positioning within the notch being aligned therewith to facilitate alignment of the first and second parts enclosing the vial within the casing interior.

9. The level of claim 8 wherein the outer edges are sealed together forming hermetically-sealed vial casing interior.

10. The level of claim 9 wherein the first and second part-walls have substantially equal exterior axial dimensions.

11. A method of manufacturing a level of the type having an elongate hollow frame including two sidewalls each defining axially aligned vial openings into the frame, comprising:
providing a liquid-and-bubble vial with a substantially cylindrical outer vial surface extending between two vial ends;
providing a vial casing having first and second parts each formed of a round face-wall bordered by a surrounding cylindrical wall terminating at an outer edge and having (a) a pair of opposed major wall-portions of first thickness and (b) a pair of opposed intervening wall-portions of second thickness which is greater than the first thickness, each intervening wall-portion defining a recess conforming to dimensions of the vial ends;
placing the vial into the first casing part with the vial ends snugly in the first-part recesses;
connecting outer edges of both casing parts with the vial ends snugly within the recesses;
hermetically sealing the outer edges of the casing parts to form an air/water-tight casing interior enclosing the vial;
positioning the hermetically-sealed casing within the level frame axially aligning the round face-walls with the vial openings; and
securing the hermetically-sealed casing within the frame.

12. The method of claim 11 further including a step of, prior to securing the casing, calibrating the vial orientation by rotating the surrounding cylindrical wall about the axis.

13. The method of claim 11 wherein the first and second part-walls are in mating engagement at their outer edges.

14. The method of claim 13 wherein:
the first part-wall includes a partial wall-thickness extension beyond the outer edge;
the second part-wall defines an indentation at the outer edge; and
the connecting step includes positioning the extension within the indentation.

15. The method of claim 14 wherein the first and second part-walls have substantially equal exterior axial dimensions.

16. The method of claim 14 wherein:
the first part-wall extension defines a notch therein;
the second part-wall has a tooth extending from the indentation and dimensioned for positioning within the notch being aligned therewith; and
the connecting step further includes the step of positioning the tooth within the notch thereby aligning the first and second parts for proper hermetic sealing thereof.

* * * * *